United States Patent [19]
Kim

[11] Patent Number: 5,974,047
[45] Date of Patent: Oct. 26, 1999

[54] METHOD FOR DECOUPLING A CELL RATE IN AN ASYNCHRONOUS TRANSFER MODE

[75] Inventor: Deong-Nyoun Kim, Seoul, Rep. of Korea

[73] Assignee: Daewoo Electronics Co., Ltd., Rep. of Korea

[21] Appl. No.: 08/922,980

[22] Filed: Sep. 2, 1997

[30] Foreign Application Priority Data

Aug. 31, 1996 [KR] Rep. of Korea .................. 9637619

[51] Int. Cl.⁶ .......................... H04L 12/28; H04L 12/56; H04J 3/16; H04J 3/22
[52] U.S. Cl. ............................ 370/395; 370/469
[58] Field of Search ............................. 370/395, 465, 370/469, 398, 235, 236, 505

[56] References Cited

U.S. PATENT DOCUMENTS

| | | |
|---|---|---|
| 5,418,786 | 5/1995 | Loyer et al. |
| 5,485,456 | 1/1996 | Shiayer et al. |
| 5,568,470 | 10/1996 | Ben-Nun et al. |
| 5,600,650 | 2/1997 | Oskouy .................. 370/468 |
| 5,796,735 | 8/1998 | Miller et al. .............. 370/395 |

*Primary Examiner*—Chi H. Pham
*Assistant Examiner*—Brenda H. Pham
*Attorney, Agent, or Firm*—Anderson Kill & Olick

[57] ABSTRACT

A method, for use in an asynchronous transfer mode (ATM), for effectively decoupling a cell transfer rate between a higher cell transfer rate segmentation and reassembly (SAR) layer and a lower cell transfer rate physical (PHY) layer in a universal test and operations PHY interface for ATM (UTOPIA) is provided. After processing scheduling for cell data based on a bandwidth assignment table of the SAR layer to produce scheduling information, valid cell information of the valid cells is detected from the scheduling information. In accordance with a cell control signal generated based on the valid cell information, idle cells are discarded and valid cells are transmitted to the PHY layer.

2 Claims, 6 Drawing Sheets

METHOD FOR DECOUPLING A CELL RATE IN AN ASYNCHRONOUS TRANSFER MODE

FIELD OF THE INVENTION

The present invention relates to a method for decoupling a cell transfer rate in an asynchronous transfer mode(ATM); and, more particularly, to a method capable of decoupling a cell transfer rate between a segmentation and reassembly (SAR) layer and a physical(PHY) layer in a universal test and operations PHY interface for ATM (UTOPIA) by transmitting valid cells to the PHY layer based on scheduling information of the SAR layer.

DESCRIPTION OF THE PRIOR ART

In the range of the high data transfer rates offered by a broadband integrated services digital network(B-ISDN), there could be a wide variety of applications employing many different data transfer rates that need to be switched with each other. An asynchronous transfer mode(ATM), a technology on which the B-ISDN is based, is a packet-oriented transfer mode, wherein multiple logical connections are allowed to be multiplexed in a single physical interface. The information flow on each logical connection is organized into fixed-size packets, called cells.

The ATM makes use of fixed-sized cells, each cell consisting of, e.g., a 5-octet header and a 48-octet payload, i.e., information field thereof. There are several advantages in using small fixed-size cells. First, the use of small cells may reduce queuing delay for a high priority cell. That is, when the high priority cell arrives behind a lower priority cell that has already gained access to a resource, then the waiting time for the high priority cell will be shorter when the lower priority cell is of a smaller size than when it is of a larger size. Secondly, it appears that fixed-size cells can be switched with each other more efficiently than those of variable-sizes, which is important for the very high data transfer rates of the ATM.

In order to connect a host system or a terminal to ATM networks, e.g., an ATM local area network(ATM LAN), an ATM connection device is needed, wherein the ATM connection device is divided into the SAR layer and the PHY layer. The SAR layer is responsible for segmenting any message to generate a plurality of fixed-sized ATM cells or reassembling the ATM cells to reconstruct a message based on a predetermined ATM adaptive layer(AAL) protocol, i.e., AAL1, AAL2, AAL3/4 or AAL5; and the PHY layer is responsible for encoding the ATM cells fed thereto from the SAR layer to provide the encoded data to another SAR layer. If the ATM connection device abides with a predetermined standard connection protocol, a multiple number of different PHY layers can easily be connected to the SAR layer.

In the meantime, idle cells may be inserted and extracted in order to adapt the cell transfer rate at the boundary between the SAR layer and the PHY layer to the available payload capacity of the transmission media. This is called cell transfer rate decoupling. The idle cells are identified by a standardized pattern for the header thereof as follows:

|  | octet1 | octet2 | octet3 | octet4 | octet5 |
|---|---|---|---|---|---|
| Header pattern | 00000000 | 00000000 | 00000000 | 00000001 | HEC = 01010010 | wherein the octet 5 represents a header error control (HEC) for each idle cell.

A service data unit(SDU) crossing the boundary between the SAR layer and the PHY layer is a flow of valid cells.

Also, the UTOPIA is a proposed standard to interface the multiple number of different PHY layers to the SAR layer, which is proposed by an ATM forum. Referring to FIG. 1, there is shown a block diagram of a conventional UTOPIA of an SAR layer and a PHY layer, wherein the UTOPIA comprises an SAR layer 100 and a PHY layer 110 which includes a PHY transmitter 101 and a PHY receiver 102.

Since many integrated circuits can perform the functions of the SAR layer and/or the PHY layer, the SAR layer can be easily connected to the PHY layer by using a common integrated circuit to meet the requirements of the standard UTOPIA. However, even if integrated circuits for a higher cell transfer rate SAR layer and a lower cell transfer rate PHY layer meet requirements of the standard of the UTOPIA, cell transfer rate difference between a higher cell transfer rate SAR layer and a lower cell transfer rate PHY layer prevents the connection therebetween.

Referring to FIG. 2, there is shown a block diagram of another embodiment for decoupling a cell transfer rate in the UTOPIA between the higher cell transfer rate SAR layer 1 and the lower cell transfer rate PHY layer 5, which comprises an SAR layer 1, an idle cell extractor 2 and a PHY layer 5. The PHY layer 5 includes a PHY transmitter 3 and a PHY receiver 4. For data transmitting, there are transmitting connection signals between the SAR layer 1 to the PHY transmitter 3, such as transmitter data TxData1[7:0] and TxData2[7:0], a transmitter start of cell TxSOC, a transmitter enable /TxEnb1 and /TxEnb2, a transmitter full /TxFull1 and /TxFull2 and a transmitter clock TxClk. For data receiving, there are receiving connection signals between the PHY receiver 4 to the SAR layer 1, such as receiver data RxData[7:0], a receiver start of cell RxSOC, a receiver enable /RxEnb, a receiver empty /RxEmpty and a receiver clock RxClk.

The transmitter data TxData1[7:0] and TxData2[7:0] are byte-wide ATM cell data driven from the SAR layer to the PHY layer 5; the transmitter start of cell TxSOC is a signal in which the SAR layer 1 informs the PHY layer 5 of an opening of an ATM cell, wherein the SAR layer 1 asserts this signal HIGH when the transmitter data TxData1[7:0] contains a first byte of an ATM cell; the transmitter enables /TxEnb1 and /TxEnb2 are signals in which the SAR layer 1 informs the PHY layer 5 the validity of the transmitter data TxData1[7:0] and TxData2[7:0], wherein the SAR layer 1 asserts the signal LOW when the transmitter data TxData1 [7:0] contains valid cell data. The transmitter fulls /TxFull1 and /TxFulls are signals in which the PHY layer 5 informs the SAR layer 1 that the PHY layer 5 is full, wherein the PHY layer 5 asserts the transmitter full /TxFull2 LOW at least four cycles before the PHY layer 5 is no longer able to accept transmitter data; and a transmitter clock TxClk is a data transfer/synchronization clock input to idle cell extractor 2 and the PHY layer 5.

The receiver data RxData[7:0] is byte-wide ATM cell data driven from the PHY layer 5 to the SAR layer 1; the receiver start of cell RxSOC is a signal in which the PHY layer 5 informs the SAR layer 1 an opening of an ATM cell, wherein the PHY layer 5 asserts this signal HIGH when the receiver data RxData[7:0] contains the first byte of an ATM cell; the receiver enable /RxEnb is a signal in which the SAR layer 1 informs the PHY layer 5 the validity of the receiver data RxData[7:0], wherein the SAR layer 1 asserts the receiver enable /RxEnb LOW when the transmitter data RxData[7:0] contains valid cell data. The receiver empty /RxEmpty is a signal in which the PHY layer 5 informs the SAR layer 1 that the buffer of the PHY receiver 3 is empty and there is nothing to transfer to the SAR layer 1, wherein the PHY layer 5 asserts the receiver empty /RxEmpty LOW. When the receiver empty /RxEmpty is asserted, there is no valid data on the current cycle.

Referring to FIG. 3, there is shown a block diagram illustrating the idle cell extractor 2 shown in FIG. 2. First of all, in a shift register 10, 5 byte header data in ATM cell data fed from the SAR layer 1 having a higher cell transfer rate is temporally stored and provided to a comparator 12; and 48 byte payload data in the ATM cell data is either transmitted or discarded. The comparator 12 compares the header data fed from the shift register 10 with a header format of the idle cell to provide a comparison signal to a controller 14.

The controller 14 generates a control signal based on the comparison signal fed from the comparator 12, wherein the control signal, which directs the ATM data cell transmitting or discarding thereof, is provided to the shift register 10.

The shift register 10 has at least 5 D flip-flops connected in series and processes ATM cell data on an 8-bit basis. If there exists no ATM cell header data; or a portion of ATM cell header data is stored and the remaining ATM cell header data is inputted, then, the controller 14 makes the transmitter enable signal /TxEnb activate so that the header data fed intermittently can be displayed sequentially.

If a second transmitter full signal /TxFull2 is inputted from the PHY layer 5 during the shift of the ATM cell payload data through the shift register 10, a first transmitter full signal /TxFull1 is activated so that an additional data input is cut off from the SAR layer 1.

If all of the ATM cell payload data are provided from the SAR layer 1 to the PHY layer 5, the /TxFull1 is repeatedly activated.

In the meantime, if a comparison result, i.e., the comparison signal from the comparator 12 represents that a current cell inputted is an idle cell, then the current 5 byte header data and the following 48 byte payload data are discarded and the /TxEnb2 is inactivated. On the contrary, if the current cell inputted is no idle cell, the preceding 5 byte header data and the following 48 byte payload data from the SAR layer 1 are provided as the TxData2[7:0] to the PHY layer 5 sequentially on an 8-bit basis based on the /TxFull2.

Since there is no need to store the payload data, contrary to the header data, the payload data is shifted and provided as the TxData2[7:0] in an input sequence. The TxFull2 has no sooner been activated from the PHY layer 5 during the transmission than the TxFull1 is activated so that an input for the following data is obstructed. Even if the TxFull1 is activated, up to 4 bytes of cell data may be further fed and stored in the shift register 10 sequentially.

However, in order to transmit ATM cell data between a higher cell transfer rate SAR later 1 and a lower cell transfer rate PHY layer 5 through the idle cell extractor 2, the 5 byte header data in the ATM cell data fed from the SAR layer 1 is first provided to the idle cell extractor 2 and then the remaining 48 byte payload data of the ATM cell data is either transmitted or discarded based on the comparison result of the 5 byte header data with the idle cell header format at the comparator 12; andr therefore, the idle cell extractor 2 has a complex structure, which, in turn, results in the delay in the data delivery time and thus hampers real-time service for the message.

SUMMARY OF THE INVENTION

It is, therefore, a primary object of the present invention to provide a method for a universal test and operations physical interface for ATM (UTOPIA) for effectively decoupling a cell transfer rate between a Segmentation and Reassembly (SAR) layer and a physical (PHY) layer by transmitting valid cells based on scheduling information of the SAR layer so that it is possible to transmit ATM cell data between a higher cell transfer rate SAR layer and a lower cell transfer rate PHY layer without delay.

In accordance with the invention, there is provided a method, for use in an asynchronous transfer mode (ATM), for effectively decoupling a cell rate between a higher rate segmentation and reassembly (SAR) layer and a lower rate physical (PHY) layer in a universal test and operations PHY interface for ATM (UTOPIA), the method comprising the steps of:

(a) processing a scheduling for cell data based on a bandwidth assignment table of the SAR layer to produce scheduling information, wherein the bandwidth assignment table represents information of valid cells and idle cells and the idle cells are inserted in order to adapt the cell rate at the boundary between the SAR layer and the PHY layer to an available payload capacity of a transmission media.;

(b) detecting valid cell information of the valid cells from the scheduling information;

(c) generating a cell control signal based on the valid cell information, wherein the cell control signal represents the number of the valid cells; and (d) discarding the idle cells based on the control signal to transmit the valid cells to the PHY layer.

BRIEF DESCRIPTION OF THE DRAWINGS

The above and other objects and features of the present invention will become apparent from the following description of preferred embodiments given in conjunction with the accompanying drawings, in which.

DETAILED DESCRIPTION OF THE PREFERRED EMBODIMENTS

Figure 1:
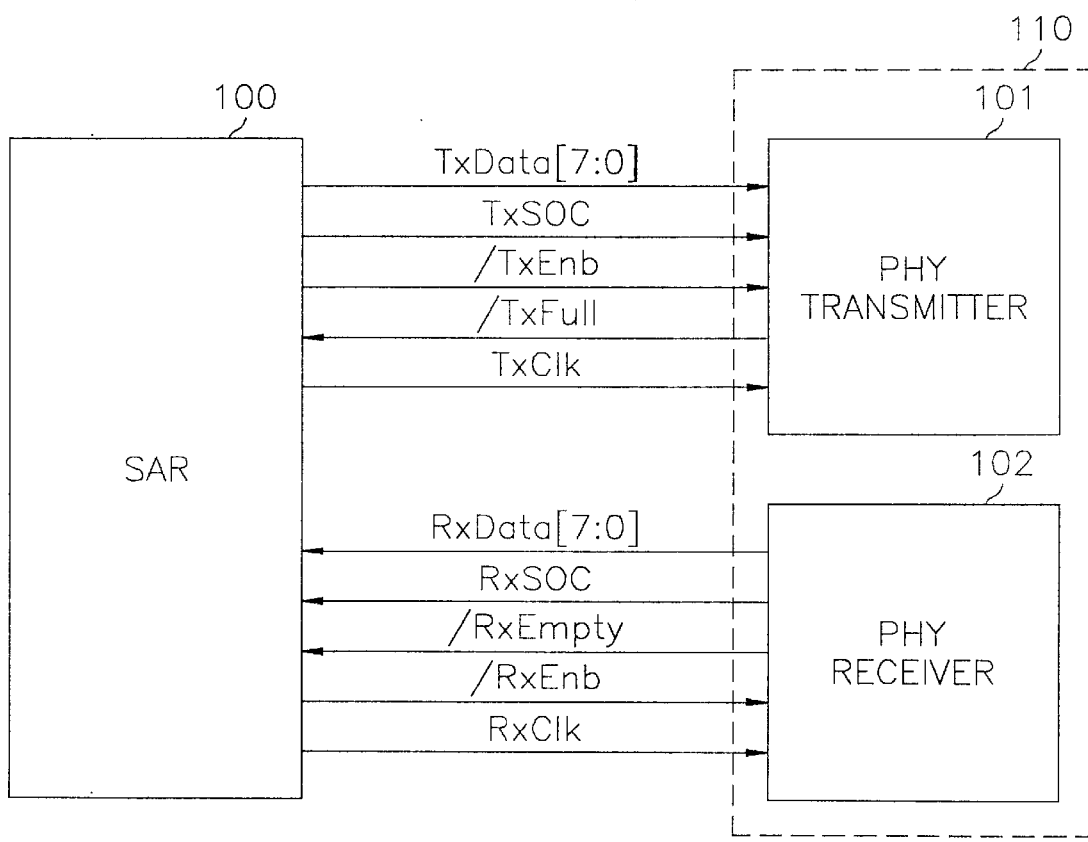
FIG. 1 represents a block diagram of a conventional UTOPIA interface between a segmentation and reassembly (SAR) layer and a physical (PHY) layer.
Figure 2:
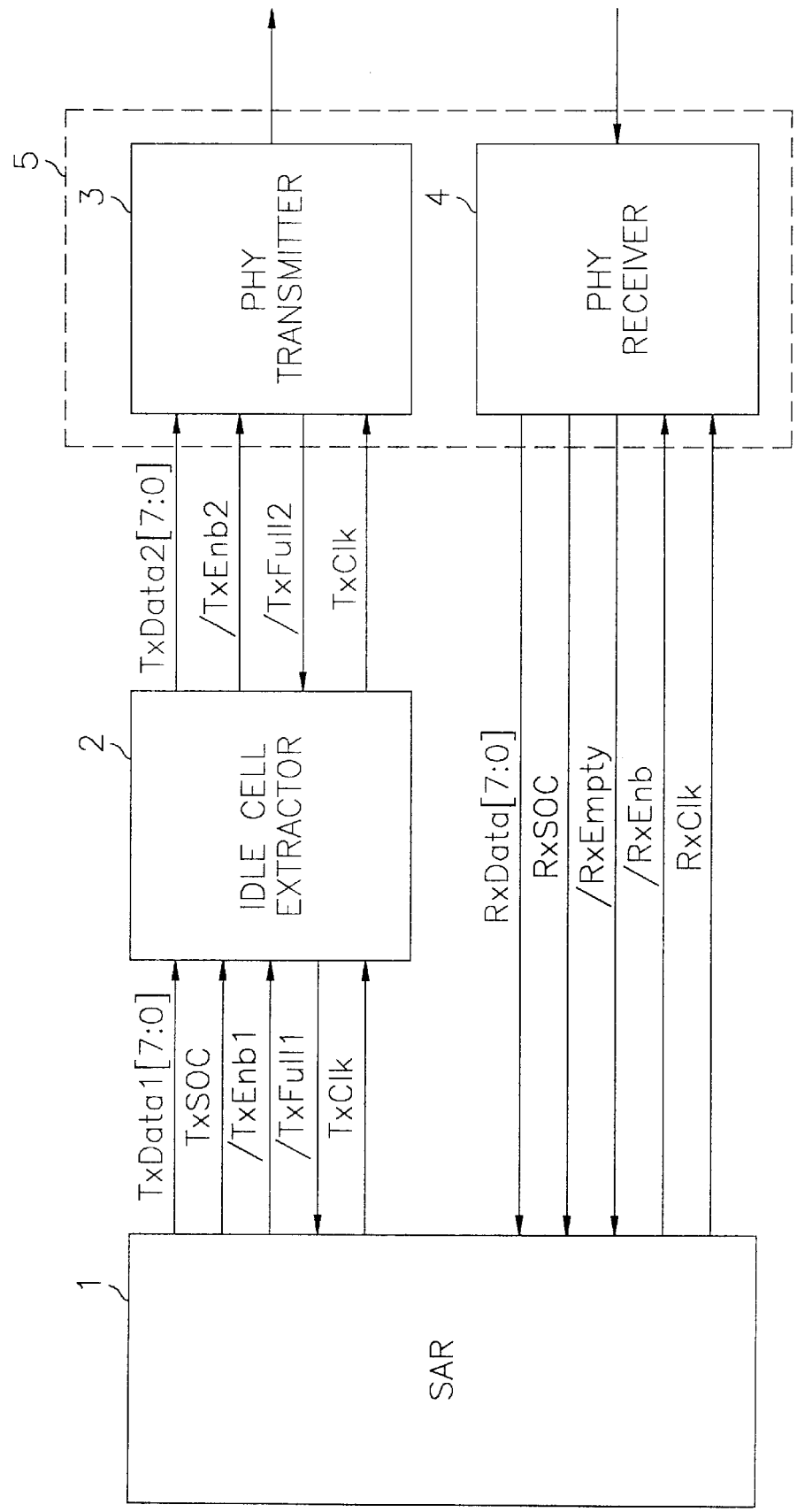
FIG. 2 provides a block diagram of a conventional apparatus for decoupling a cell transfer rate between an SAR layer with a higher cell transfer rate and a PHY layer with a lower cell transfer rate in the conventional UTOPIA.
Figure 3:
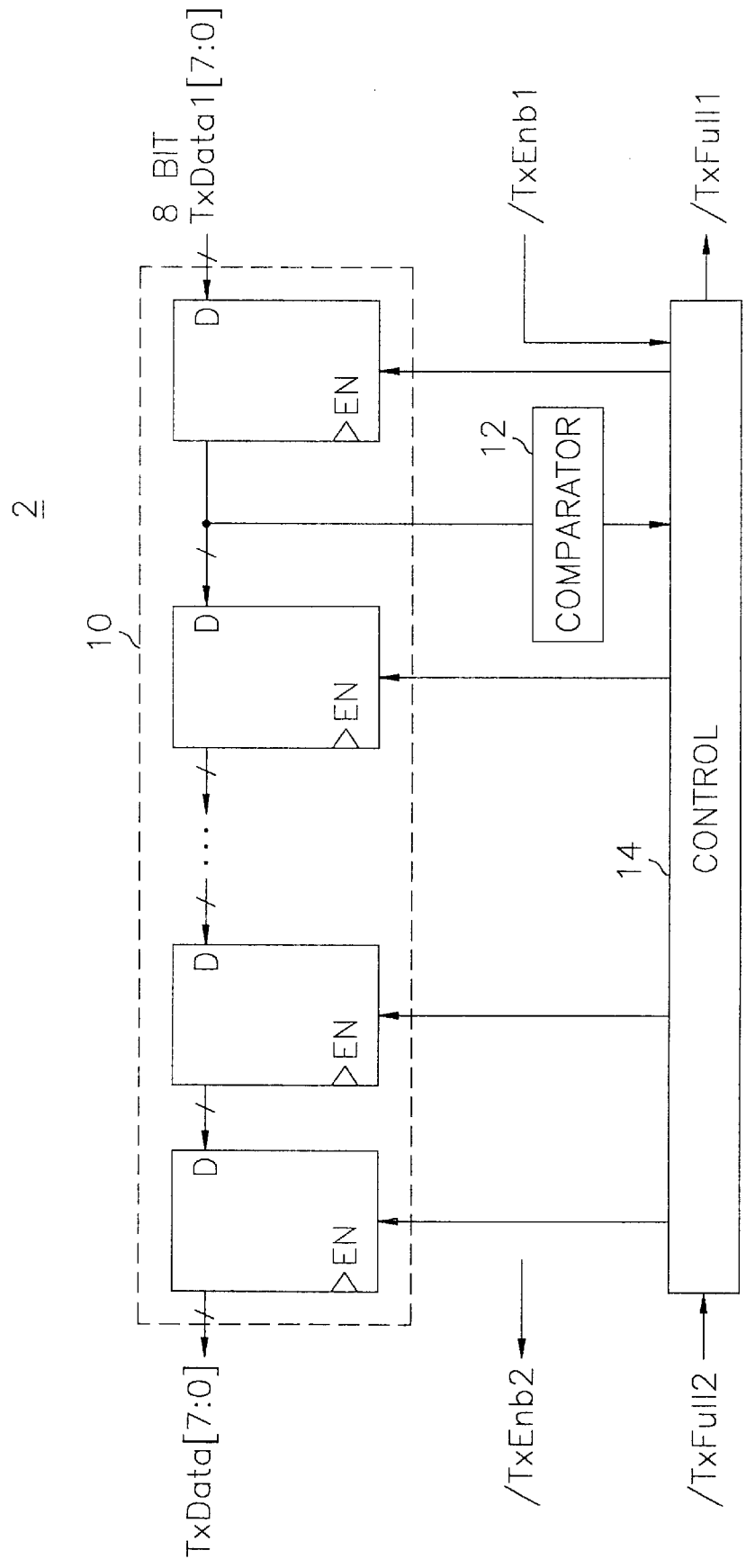
FIG. 3 shows a block diagram of an idle cell extractor shown in FIG. 2.
Figure 4:
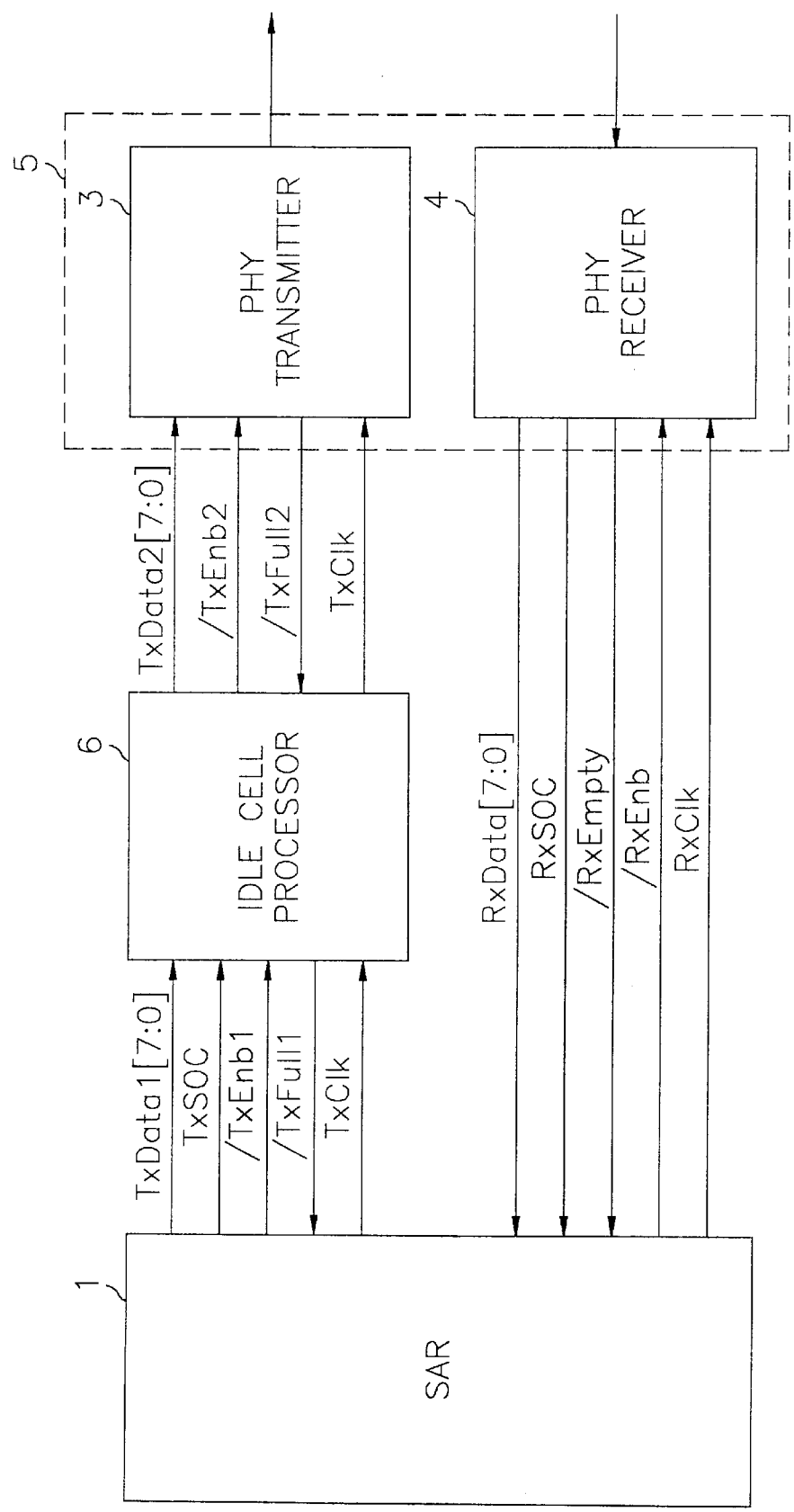
FIG. 4 illustrates a block diagram of an apparatus for decoupling a cell transfer rate between the higher cell transfer rate SAR layer and the lower cell transfer rate PHY layer in the UTOPIA in accordance with the present invention.

Referring to FIG. 4, there is shown a block diagram of an apparatus for decoupling a cell transfer rate between a segmentation and assembly (SAR) layer 1 and a physical (PHY) layer 5 in a universal test and operations PHY interface for ATM (UTOPIA) in accordance with the present invention, wherein an idle cell processor 6 is inserted between the SAR layer 1 and a PHY transmitter 3 included in the PHY layer 5 and the cell transfer rate is decoupled by the use of scheduling information based on a bandwidth assignment table of the SAR layer 1. The only difference between FIG. 4 and FIG. 2 is that the idle cell processor 6 replaces the idle cell extractor 2 in FIG. 2.

The idle cell processor 6 processes a scheduling for the cell data based on the bandwidth assignment table fed from the SAR layer 1 to produce scheduling information, wherein the bandwidth assignment table represents information of valid cells and idle cells. The idle cells are inserted in order to adapt the cell transfer rate at the boundary between the SAR layer 1 and the PHY layer 5 to an available payload capacity of a transmission media. The idle cell processor 6 transmits the valid cells or discards the idle cells depending on the scheduling information.

Figure 5:
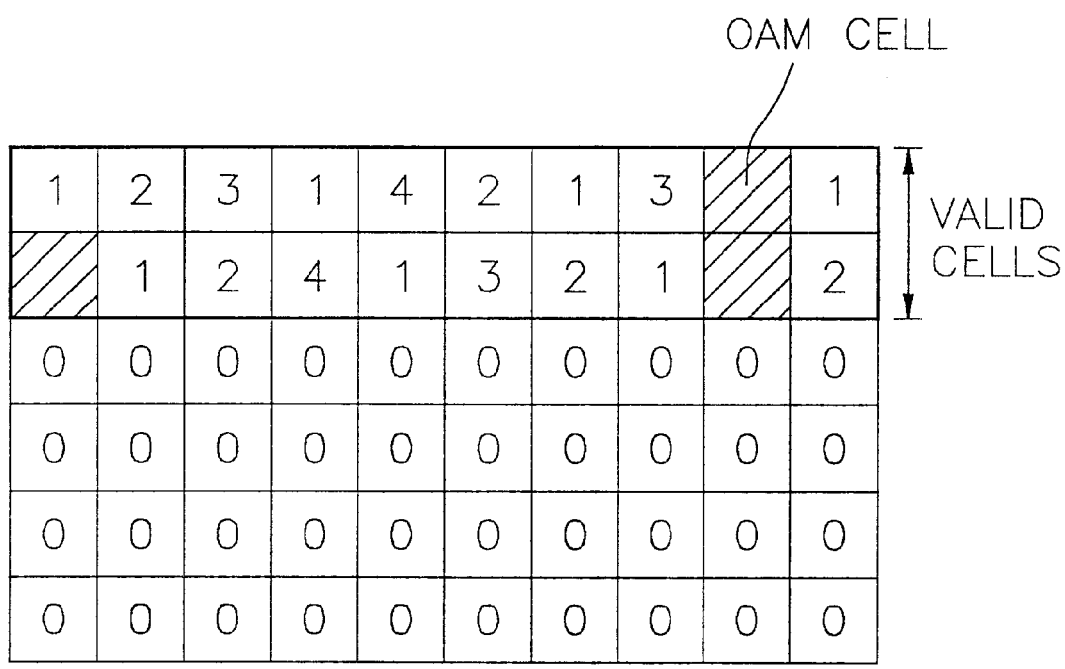
FIG. 5 is an exemplary bandwidth assignment table of cell data in the SAR layer.

Referring to FIG. 5, there is shown an exemplary bandwidth assignment table of cell data in the SAR layer 1. In the bandwidth table, valid data uses 20 cells in first two lines to generate a valid cell for the valid data and the remaining 40 cells in the remaining lines are filled with idle cells. Accordingly, if the number of cells transmitted can be counted, 21st to 60th cells are discarded based on the bandwidth assignment table so that the idle cells can be simply discarded. In other words, without detecting every cell header data fed from the SAR layer 1, the number of idle cells to be discarded can be obtained by using the number of valid cells. The number of cells is obtained by counting the transmitted cells starting from the input of the TxSOC from the SAR layer 1.

Figure 6:
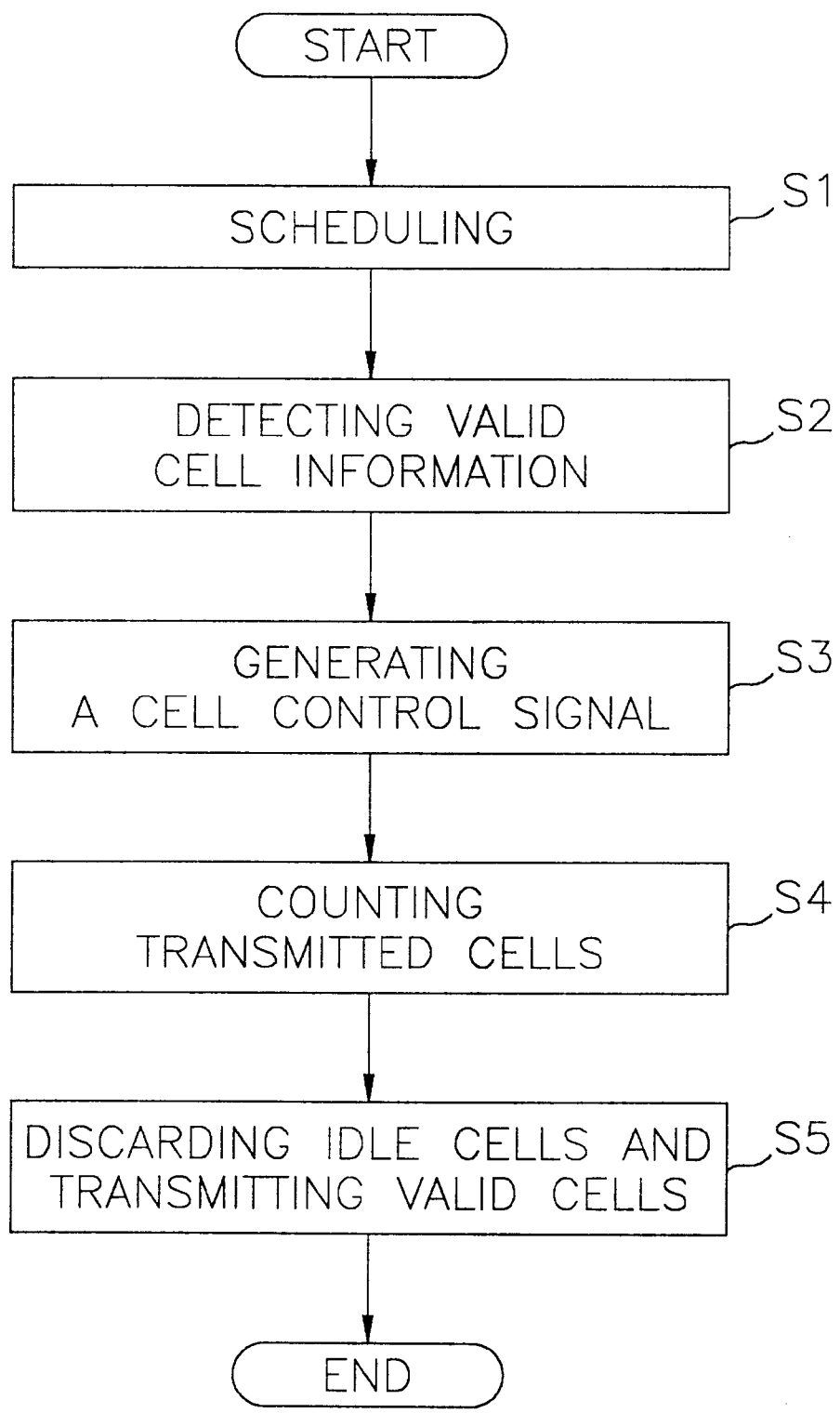
FIG. 6 presents a flow chart of a method for decoupling a cell transfer rate between the SAR layer and the PHY layer in the UTOPIA in accordance with the present invention.

Referring to FIG. 6, there is shown a flow chart of a method for decoupling a cell transfer rate between the SAR layer 1 and the PHY layer 5 in the UTOPIA in accordance with the present invention, wherein the cell transfer rate represents a transmission speed of ATM cells.

First of all, at step S1, a scheduling for cell data fed from an SAR layer 1 of higher cell transfer rate is executed based on the bandwidth assignment table of the SAR layer 1 to produce schedule information for the valid cells and the idle cells and, at step S2, valid cell information for valid cell data is detected from scheduling information. And, at step S3, a cell control signal is generated based on the valid cell information of the valid cells, wherein the cell control signal represents the number of the valid cells. At step S4, if a transmitter start of cell (TxSOC) signal fed from the SAR layer 1 to the idle cell processor 6 is detected, transmitted cells are counted in accordance with the TxSOC signal to generate a transmitted cell number, and, at step S5, the transmitted cell number is compared with the cell control signal to discard the idle cells and transmit the valid cells to the PHY layer 5 based on the cell control signal.

While the present invention has been described with respect to the particular embodiments, it will be apparent to those skilled in the art that various changes and modifications may be made without departing from the scope and spirit of the invention as defined in the following claims.

What is claimed is:

1. A method, for use in an asynchronous transfer mode (ATM), for effectively decoupling a cell transfer rate between a higher cell transfer rate segmentation and reassembly (SAR) layer and a lower cell transfer rate physical layer in a universal test and operations PHY interface for ATM (UTOPIA), the method comprising the steps of:

(a) processing a scheduling for cell data based on a bandwidth assignment table of the SAR layer to produce scheduling information, wherein the bandwidth assignment table represents information of valid cells and idle cells and the idle cells are inserted in order to adapt the cell transfer rate at the boundary between the SAR layer and the PHY layer to an available payload capacity of a transmission media;

(b) detecting valid cell information of the valid cells from the scheduling information;

(c) generating a cell control signal based on the valid cell information, wherein the cell control signal represents the number of the valid cells; and (d) discarding the idle cells based on the cell control signal to transmit the valid cells to the PHY layer.

2. The method according to claim 1, wherein said step (d) further includes the steps of:

(d1) catching a transmitter start of cell (TxSOC) fed from the SAR layer, wherein the TxSOC represents a signal in which the SAR layer informs the PHY layer of an opening of an ATM cell;

(d2) counting the number of transmitted cells based on the TxSOC to generate a transmitted cell number; and (d3) comparing the transmitted cell number with the cell control signal.

\* \* \* \* \*

UNITED STATES PATENT AND TRADEMARK OFFICE
CERTIFICATE OF CORRECTION

PATENT NO. : 5,974,047
DATED : Oct. 26, 1999
INVENTOR(S) : Deog-Nyoun Kim

It is certified that error appears in the above-identified patent and that said Letters Patent is hereby corrected as shown below:

On the title page, insert item [75], Inventor Deog-Nyoun Kim

Signed and Sealed this

First Day of August, 2000

*Attest:*

Q. TODD DICKINSON

*Attesting Officer*  *Director of Patents and Trademarks*